(12) United States Patent
Davis et al.

(10) Patent No.: US 6,447,038 B1
(45) Date of Patent: Sep. 10, 2002

(54) ENCLOSED TRAILER

(76) Inventors: Grady L. Davis, 3527 Casper Dr., Lot 33, Gainesville, GA (US) 30506; Diane J. Davis, 3527 Casper Dr., Lot 33, Gainesville, GA (US) 30506

(*) Notice: Subject to any disclaimer, the term of this patent is extended or adjusted under 35 U.S.C. 154(b) by 0 days.

(21) Appl. No.: 09/754,392

(22) Filed: Jan. 2, 2001

(51) Int. Cl.[7] .................................................. B60P 3/10
(52) U.S. Cl. ................. 296/26.05; 296/181; 280/414.1
(58) Field of Search .......................... 296/26.04, 26.05, 296/182, 181, 100.02; 114/361; 280/414.1, 141.3

(56) References Cited

U.S. PATENT DOCUMENTS

| | | | |
|---|---|---|---|
| 3,494,655 A | * | 2/1970 | Linton .................. 296/26.05 X |
| 3,506,300 A | * | 4/1970 | Remmert ............. 296/26.05 X |
| 3,608,954 A | * | 9/1971 | Lynd ................... 296/26.05 X |
| 4,223,414 A | | 9/1980 | Dickson |
| 4,406,477 A | * | 9/1983 | McDonald ........... 296/26.05 X |
| 4,554,884 A | | 11/1985 | Bouliane |
| 4,767,132 A | | 8/1988 | Avery |
| 4,934,302 A | | 6/1990 | Harper |
| 4,979,457 A | | 12/1990 | Sommerhauser |
| 5,009,184 A | | 4/1991 | Voldrich |
| 5,058,946 A | | 10/1991 | Faber |
| 5,228,408 A | | 7/1993 | Jannausch |
| D356,058 S | | 3/1995 | Newton |
| 5,479,872 A | | 1/1996 | Hulett |
| 5,481,999 A | | 1/1996 | Clark |
| 5,505,515 A | * | 4/1996 | Turner ......................... 296/173 |
| 5,549,438 A | | 8/1996 | Dwyer et al. |
| 5,564,358 A | | 10/1996 | Newton |
| 5,632,223 A | | 5/1997 | Bray et al. |
| 5,848,870 A | * | 12/1998 | Smith et al. ......... 296/26.05 X |
| 5,951,096 A | * | 9/1999 | Steury et al. ........ 296/26.05 X |
| 6,196,604 B1 | * | 3/2001 | Hoh et al. ............... 296/26.05 |

FOREIGN PATENT DOCUMENTS

GB 2241205 A * 2/1990 ............. 296/26.05

* cited by examiner

Primary Examiner—Stephen T. Gordon
Assistant Examiner—Jason Morrow
(74) Attorney, Agent, or Firm—Hinkle & O'Bradovich, LLC

(57) ABSTRACT

The present invention relates generally to the field of trailers and, more particularly, the present invention relates to a boat trailer which incorporates a cover for the trailer to enclose a stored boat upon the trailer. The cover is selectively raised by a winch mechanism to facilitate the loading and off loading of the boat from the trailer.

3 Claims, 4 Drawing Sheets

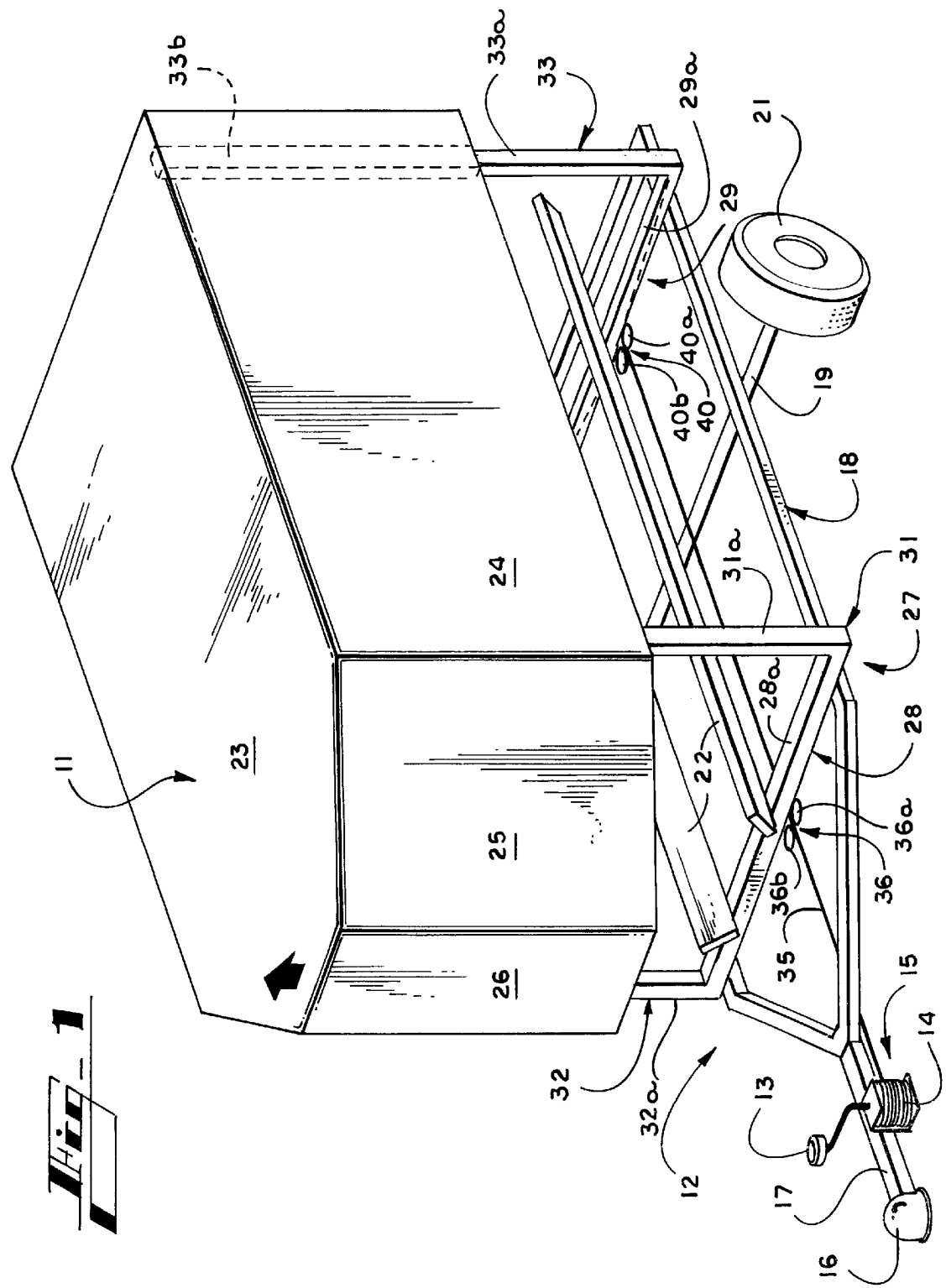

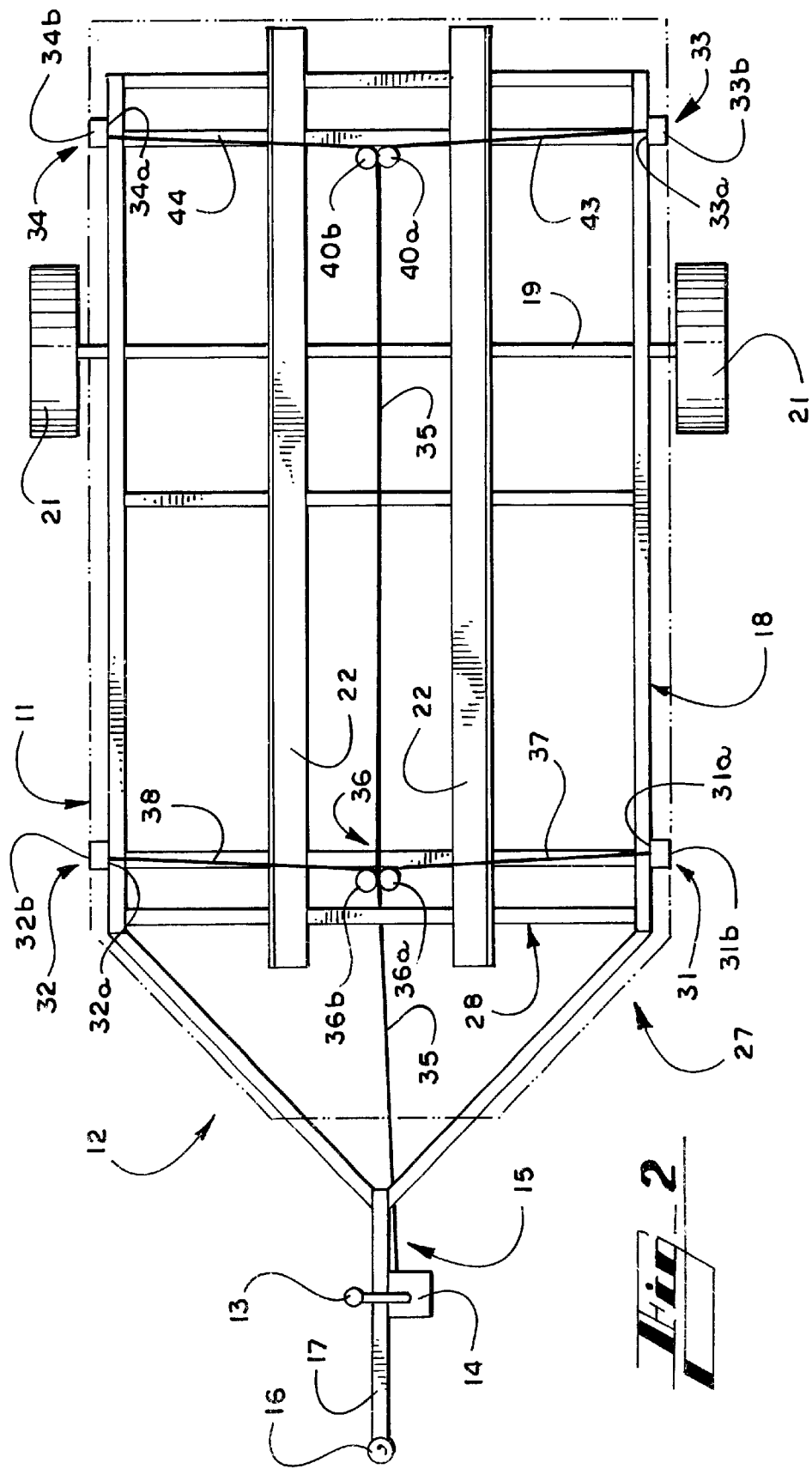

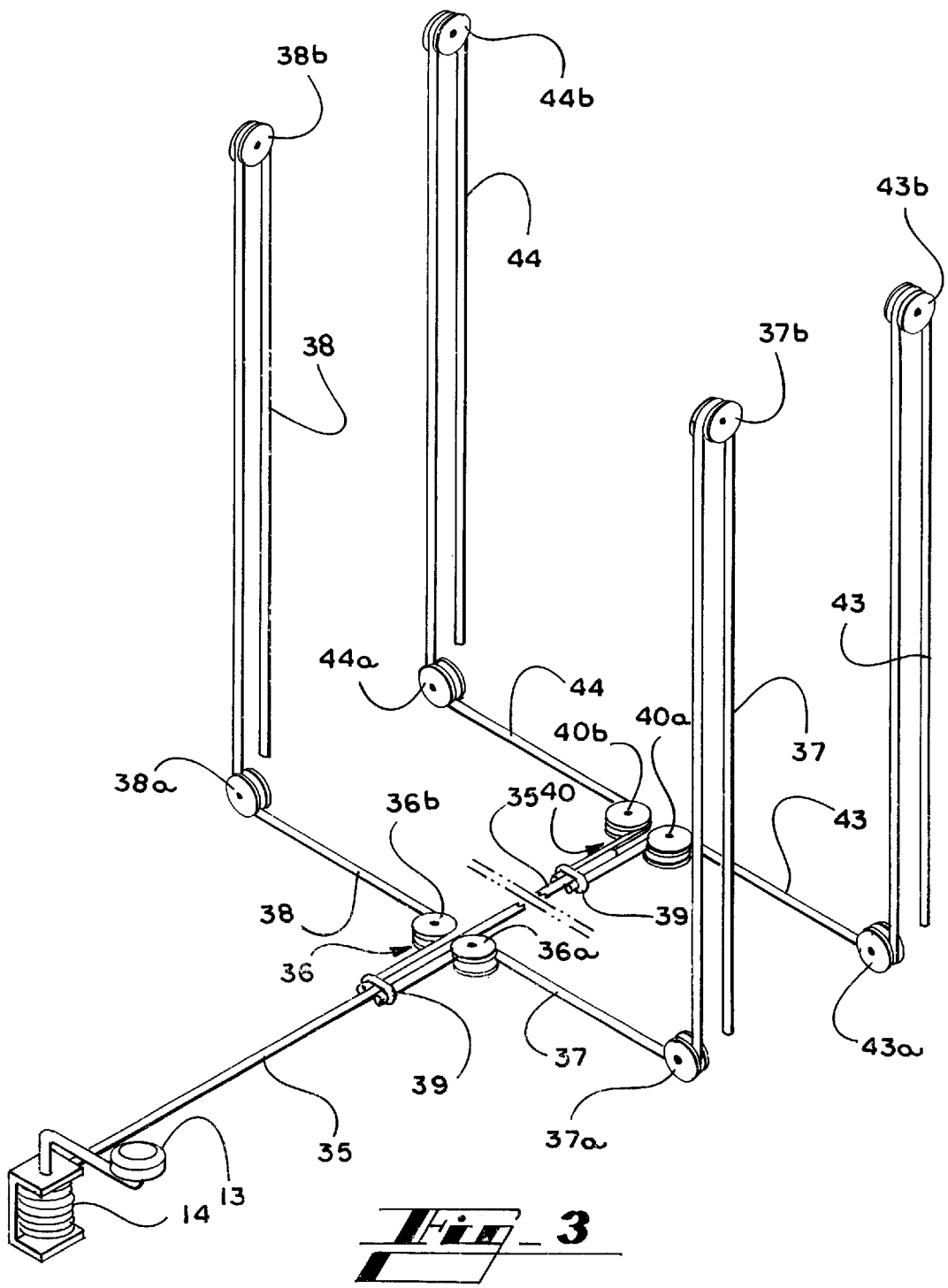
Fig_3

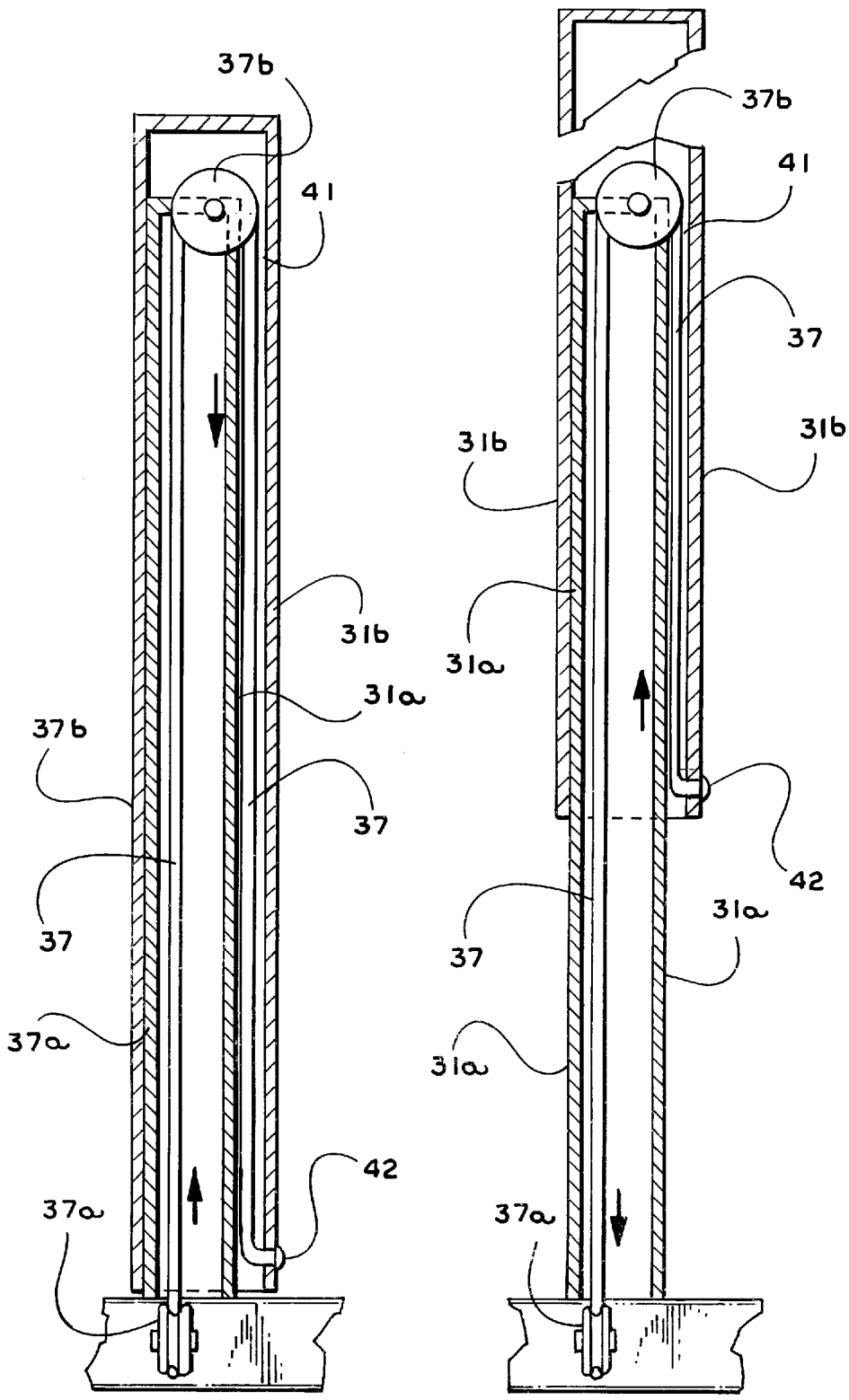
Fig_4A   Fig_4B

ENCLOSED TRAILER

BACKGROUND OF THE INVENTION

1. Field of the Invention

The present invention relates generally to the field of trailers and, more particularly, the present invention relates to a boat trailer which incorporates a cover for the trailer to enclose a stored boat upon the trailer. The cover is selectively raised by a winch mechanism to facilitate the loading and off loading of the boat from the trailer. However, the present invention is not limited to boat trailers, but may find applicability across a wide range of trailers to provide a movable cover for many different types of goods to be covered.

2. Description of the Related Art

In their desire to maintain their boats in a pristine condition, many people will cover a small boat when it is stored on a trailer. Most notably, covers are of a canvas-like material and are fitted to the upper outline of the boat and then secured to the boat by strapping the cover to the boat and/or to the trailer. Obviously, canvas-like material is somewhat fragile in nature and will degrade over time from sunlight and weather elements. In the past, boat owners have resorted to incorporating hard covers to boat trailers due to the derogation of the canvas material. The hard covers will resist the elements and provide not only protection to the boat from the elements, but will also provide security to the boat and its associated equipment.

Various forms of hard covers are known in the prior art, but, generally, the prior covers have suffered from one or more deficiencies which the present invention seeks to overcome.

A hard boat cover attached to a trailer is shown in U.S. Pat. No. 4,767,132 granted to Avery which shows a hard cover mounted to a boat trailer, which cover, however, is not removable and the boat must be placed on the trailer by moving the boat in and out of a opening rear door. This obviously is a cumbersome procedure not easily accomplished with the boat and trailer in the water.

In U.S. Pat. No. 4,223,414 granted to Dickson, a fitted hard cover is attached to a boat trailer and has a mechanism for raising the cover from a front position of the trailer in a clam shell manner. This particular cover overcomes some of the problems of U.S. Pat. No. 4,767,132, but adds a complicated mechanism for raising the cover and only fits one style of boat.

U.S. Pat. No. 4,934,302 granted to Harper discloses another type of fitted boat hard cover attached to a boat trailer with a mechanism to raise the cover from the front position in a clam shell manner.

In U.S. Pat. No. 5,058,946 granted to Faber, another hard shell fitted boat cover is shown also mounted for operation from the front of the trailer, but this particular cover is designed specifically for a particular type of boat and is not adaptable to a wide variety of boats.

SUMMARY OF THE INVENTION

In accordance with the present invention and the contemplated problems which have and continue to exist in this field, the objectives of this invention are to provide an enclosed trailer for boats wherein the enclosure is a hard cover which will fit a variety of boats and is easily lifted above the boat from a position at the front of the trailer, thereby permitting easy launching and retrieval of the boat. The invention is simple in scope, is easily executable and adapted to any boat trailer, and is easily operable by a single person without having to get into the water to operate the invention.

This invention accomplishes the above and other objectives by taking a relatively standard boat trailer and fitting the trailer with a plurality of vertical telescoping cover support members which are generally affixed to the trailer by suitable support members and to attach to the telescoping support members a hard boat cover which will cover the trailer and any associated boat placed on the trailer. The hard cover is capable of being raised and lowered by action of the vertical telescoping cover support members which are integrally attached to a winch cable, which cable is adapted to be mounted upon the trailer tongue for operation by any operator. The cable is operatively engaged with a series of pulleys attached to both the trailer and to the telescoping cover support members thereby permitting the cover to be raised and lowered as desired.

Other objects, advantages and capabilities of the invention will become apparent from the following description taken in conjunction with the accompanying drawings showing the preferred embodiment of the invention.

BRIEF DESCRIPTION OF THE DRAWINGS

FIG. 1 is a perspective view of an enclosed trailer, according to the present invention, showing the hard cover partially raised;

FIG. 2 is a top plan view of the trailer showing the hard cover in phantom lines;

FIG. 3 is a perspective diagrammatic representation of the cable and pulley apparatus for raising and lowering the hard cover;

FIG. 4A is a sectional view of one of the vertical telescoping cover support members in a closed position; and FIG. 4B is a vertical section view of a vertical telescoping cover support member showing the member is a raised position.

DETAILED DESCRIPTION OF THE INVENTION

Referring to the drawings wherein like reference numerals designate corresponding parts throughout the several figures, reference is made first to FIG. 1. A cover for a boat and trailer is identified by numeral 11 and is so configured that it is mounted to trailer 12, and is capable of vertical movement by an operator turning winch handle 13 which engages winch system 14 to operate the cable system 15 which effects the raising and lowering of cover 11. It should be noted that this invention contemplates substituting for the winch 14, any of several types of activating systems such as an electrical winch or one which is operated by a hydraulic system.

The trailer 12 is essentially a conventional boat trailer having a hitch coupling 16 connected to the trailer tongue 17, which connects generally to the trailer frame 18. The trailer frame 18 has a wheel assembly comprising an axle 19 attached to the frame 18, and the axle 19 has a pair of wheels 21 attached to the outer ends of the axle. Associated with the frame 18 are several boat hull cradle members 22 which support a boat placed thereupon in a conventional manner. It should be noted that various types of trailer designs may be utilized with the present invention and the trailer design will typically be dictated by the type, size and weight of the boat to be placed on the trailer.

The cover 11 is sized and generally shaped to fit a boat which would be carried upon the trailer 12 and may take various forms in order to fit both the trailer and the desired boat. The cover, as shown in FIG. 1, is of a boxy appearance. However, it is contemplated that the cover could be of a streamlined nature as the situation may dictate. The shape and size of the cover 11 is relatively immaterial as long as it fits the boat and the trailer and is capable of being raised and lowered in the intended manner. As seen in FIG. 1, the cover 11 generally comprises a top 23, a pair of side panels 24 (only one is shown), a pair of forward quarter side panels 25 (only one is shown), a front 26 and a back (not shown). It is anticipated that the cover may be manufactured of any suitable material such as wood, metal, fiberglass and the like.

In order to support the cover l,the entire cover support frame 27 is placed upon and fixed to the trailer frame 18. The cover support frame 27 generally comprises the forward transverse cover support frame 28 and the aft transverse cover support frame 29. Each of the frames 28 and 29 have respective transverse connecting members 28a and 29a, which interconnect the respective forward port cover stanchion 31 and forward starboard cover support stanchion 32. On the aft portion of the trailer, the transverse cover support frame 29a connects to and supports the aft port cover support stanchion 33 and the aft starboard cover support stanchion 34.

Each of the support stanchions 31–34 include telescoping members comprising an inner stanchion and an outer stanchion which telescope together, and are further identified respectively as 31a and 31b for the forward port cover support stanchion, 32a and 32b for the forward starboard cover support stanchion, 33a and 33b for the aft port cover support stanchion, and 34a and 34b for the aft starboard cover support stanchion. As is noted in FIGS. 4a and 4b, the inner support stanchions are a somewhat smaller in cross-sectional area than the outer support stanchions in order to accommodate the cable system which raises and lowers the cover 11.

Referring now to the cable system 15 as more particularly shown in FIGS. 2, 3, 4A and 4B, it can be seen that the common cable 35 is wound around the winch 14 and then extends rearwardly to forward pulley array 36 at which point it is coupled with the forward port lifting cable 37 and the forward starboard lifting cable 38 by means of a suitable cable clamp 39. The forward pulley array 36 will typically be mounted to the transverse connecting member 28a and the forward port lifting cable 37 will be positioned operatively around pulley 36a and then will extend to pulley 37a, which is suitably connected to the forward port cover support frame 28, and is then directed to the forward port upper lifting pulley 37b connected to the uppermost portion (as seen in FIG. 4A) of forward port cover support inner stanchion 31a. Thence, the lifting cable 37 is positioned around pulley 37b and depends down slot 41 between inner stanchion 31 a and outer stanchion 31b where it then terminates at a fixed point 42 in the lower portion of outer stanchion 31b.

It should be noted that the various support stanchions, namely, 31, 32, 33 and 34, are of equivalent construction and, as such, only the forward port cover support stanchion is shown in detail in FIGS. 4A and 4B. Obviously, the outer cover of each stanchion is affixed to the inside of the cover 11 so that the cover is fully supported at four places to effect the lifting procedure as needed. Consequently, the details of support stanchions 32, 33 and 34 are not fully shown as they will be structurally equivalent to support stanchion 31. Therefore, it can be seen that forward starboard lifting cable 38, being connected to common cable 35, is positioned around pulley 36b, pulley 38a and pulley 38b, and then terminates to its respective outer stanchion in the manner shown in FIGS. 4A and 4B.

Common cable 35 continues aft towards aft pulley array 40 and connects to aft port lifting cable 43 and aft starboard lifting cable 44 by means of a suitable clamp 39. In the manner described with respect to the forward lifting cables, the aft port lifting cable 43 is positioned around pulley 40a and thence around the aft port lower lifting pulley 43a and the aft port upper lifting pulley 43b, which then terminates in its respective outer stanchion in the manner shown in FIGS. 4A and 4B. Similarly, the aft starboard lifting cable 44 is positioned around pulley 40b and thence around the aft pulley array 40 and thence engages aft starboard lower lifting pulley 44a and aft starboard upper lifting pulley 44b, and subsequently terminates in its respective outer stanchion in the manner shown in FIGS. 4A and 4B.

In operation, if an operator desires to load a boat upon trailer 12, and assuming that the boat is in the water, the operator would typically operate the winch handle 13 to wind the winch cable 35 upon the winch 14 which would pull the common cable 35 forwardly thereby acting upon lifting cables 37, 38, 43 and 44 and, because these cables are attached to the their respective outer stanchions, the cover 11 would be lifted vertically above the trailer to give access to the cradle members 22 for the purpose of loading a boat thereupon. At this point, typically the operator would then back the trailer into the water, float the boat into position upon the cradle members, and then remove the trailer from the water, and then firmly secure the boat to the trailer. At this point, the operator would then lower the cover 11 by reversing the winching procedure and since the cover 11 has some inherent weight it will lower itself to enclose the boat and secure all boat equipment within the cover.

Therefore, the foregoing is considered as illustrative only of the principles of the invention. Further, various modifications may be made of the invention without departing from the scope thereof and it is desired, therefore, that only such limitations shall be placed thereon as are imposed by the prior art and which are set forth in the appended claims.

What is claimed is:

1. A trailer comprising:

a trailer having a frame;

a cover support frame mounted to the trailer frame;

a plurality of substantially vertical cover supporting stanchions mounted to the cover support frame;

a cover attached to the supporting stanchions;

each of the stanchions having at least two members being telescopingly engaged with one another;

at least one of each of said telescoping members being fixed to the cover;

a cable system interconnecting the cover to the stanchions to permit raising and lowering of the cover with respect to the trailer, wherein the cable system comprises a winch mounted to the trailer, a winch cable interconnecting the winch and the telescoping stanchions; and wherein the winch cable is bifurcated at select locations and has discrete portions of the bifurcated cable interconnecting the winch cable to respective telescoping stanchions.

2. A trailer as claimed in claim 1, wherein each telescoping stanchion has an inner stanchion member and an outer stanchion member being in telescoping relationship.

3. A trailer as claimed in claim 2, wherein the discrete portion of each bifurcated winch cable is attached to a selected outer stanchion member.

* * * * *